March 19, 1957     G. MUFFLY     2,786,169

FOLLOW-UP SYSTEM

Filed Dec. 30, 1955     2 Sheets-Sheet 1

INVENTOR.
Gary Muffly.
BY
ATTORNEY

March 19, 1957 G. MUFFLY 2,786,169
FOLLOW-UP SYSTEM
Filed Dec. 30, 1955 2 Sheets-Sheet 2

INVENTOR.
BY Gary Muffly.
ATTORNEY.

United States Patent Office 2,786,169
Patented Mar. 19, 1957

2,786,169

FOLLOW-UP SYSTEM

Gary Muffly, Oakmont, Pa., assignor to Gulf Research & Development Company, Pittsburgh, Pa., a corporation of Delaware Application December 30, 1955, Serial No. 556,726

8 Claims. (Cl. 318—29)

This invention concerns an electrical follow-up or motion-repeating system whereby unlimited rotary motion of a shaft is repeated at a remote location.

There are a number of types of motion-repeating devices known, these being generally called follow-up systems. Each of the known systems however has certain difficulties. Self-synchronizing repeaters are well known and these devices have the difficulty of requiring a number of conductors between the transmitter and receiver. Usually these systems require two conductors for excitation of the rotor and three conductors to return the stator signal. While certain of these conductors may be combined, this leads to the possibility of interaction between circuits and a minimum of four conductors is required in any event.

Another well-known type of follow-up system employs a self-balancing bridge in which four resistors are connected in a bridge circuit, the transmitter being in one arm, and the receiver in an adjacent arm, with power being supplied to one diagonal of the bridge, and an amplifier connected to another diagonal of the bridge driving a motor mechanically urging the receiver into bridge balance. The difficulty with this type of device is that its range is limited by the limits of the respective resistors comprising the transmitter and the receiver since when either one of these reaches the end of its resistance, the system can follow no further.

It is an object of this invention to provide in a self-balancing electromechanical network having a servo-driven balancing element whose impedance or other electrical characteristic is a unidirectional function of position, a novel means for extending the range of motion beyond one cycle and for faithfully executing such extended motion in response to unbalance of the network.

It is another object of this invention to provide a balanced type of follow-up system with infinite range and without ambiguity in its indication.

It is another object of this invention to provide a balanced-bridge type of follow-up system in which the range limitation has been eliminated.

It is another object of this invention to provide a balanced-bridge type of follow-up system having unlimited range and requiring but a single conductor and ground return between the transmitter and receiver.

It is another object of this invention to provide a follow-up system which can use either A.-C. or D.-C. components and supply voltage.

These and other useful objects of this invention are accomplished as described in this specification, of which the drawings form a part, and in which Figure 1 is a schematic wiring diagram of a known type of balanced-bridge type of follow-up system;

Figure 2 is a wiring diagram of a balanced-bridge type of follow-up system as modified in accordance with this invention;

Figure 5:
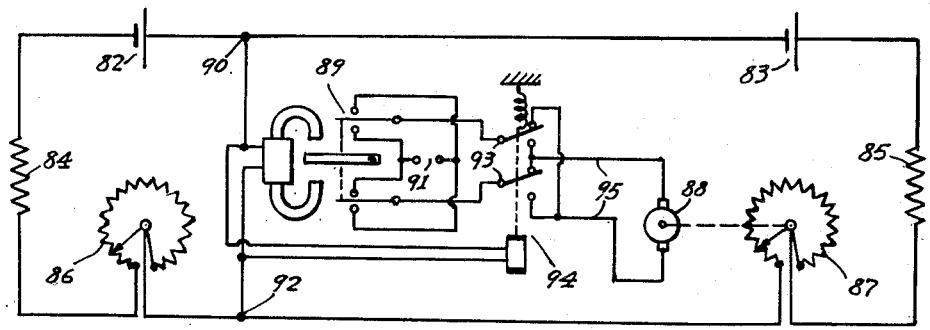
Figure 5 is a wiring diagram of a further embodiment of the invention employing a bridge circuit whose unbalance is detected and amplified by a polar relay.

This invention is useful and is applicable in any type of self-balancing network in which the balancing element has an electrical characteristic employed in the balancing operation which is a unidirectional function of position of the servo-driven member, said function having a sharp transition at the end of a cycle of motion. The invention comprises the addition to such a system of means for reversing the sense of the servo-control whenever a large error signal appears, whereby the system quickly finds a new position of balance in a state which requires a crossing of the cyclic transition of the balancing element so that motion of the balancing element faithfully follows the state of the system, and of means for restoring the sense of the servo-control as soon as the large error voltage disappears, whereby the balancing element faithfully follows variations in the state of the system which do not cross the transition. The invention will be described as applied to self-balancing bridge-type networks and to self-balancing potentiometric networks employing servo-driven circular rheostats or potentiometers.

In one embodiment the invention comprises four resistors connected in a bridge circuit with power supplied to one diagonal. A transmitting rheostat is connected in one arm of the bridge, and a receiving rheostat is connected in an adjacent arm of the bridge. The transmitter and receiver are two-terminal variable resistors which provide unlimited rotation of the contacting arm. An amplifier is connected across the other diagonal of the bridge and drives a motor mechanically connected to the contacting arm of the receiver. A relay, also driven from the bridge unbalance, is connected to reverse the motor whenever gross unbalance of the bridge occurs.

Referring to Figure 1 there is shown a known type of bridge circuit energized by battery 29 connected to points 24 and 25. Two of the arms comprise resistors 12 and 13 and the other two arms comprise transmitter 26 and receiver 27. The transmitter 26 may be located at a remote point and therefore transmitter 26 is shown with a series resistor 8 which represents the resistance of the line leading to the remote point. The resistor 21 in series with receiver 27 balances the resistor 8. The resistors 12 and 13 are so arranged that when the angular position of the contactor of receiving rheostat 27 corresponds to the angular position of the contactor of transmitting rheostat 26 the bridge is in balance. Points 22 and 23 of the bridge are connected to the input of an amplifier 16 whose output drives a motor 3 which is mechanically connected to rotate the contactor of the receiving rheostat 27 so as to reduce the voltage across points 22 and 23 to a minimum value, i. e. substantially zero. The type of follow-up system shown in Figure 1 is well known in the art. It is apparent that the range of motion of a device of this type is limited in either direction by the ends of the rheostats 26 and 27. This is a serious handicap for many applications of the device because of the physical limitations to the length of the resistors 26 and 27. These limitations are overcome by this invention.

Referring to Figure 2 there is shown a circuit in which parts having the same numeral perform the same function as correspondingly numbered parts of Figure 1. A source of supply voltage is connected to terminals 28. An A.-C. source is preferred. The source 28 is connected to points 24 and 25 of the bridge and the point 25 may be grounded as shown. The other corners of the bridge are points 22 and 23, and a transmitting rheostat 1 together with its line 8 are connected between points 22 and 25. The transmitting rheostat 1 may be at a remote location. The receiving rheostat 2 together with a dummy line resistor 21 is connected between the points 23 and 25. While a ground connection is shown connecting points 5 and 9 of the rheostats 1 and 2, it is apparent that a wire connection may be used. Resistors 12 and 13 are connected in the other two arms of the bridge as shown and are arranged so that when the contactors 6 and 7 of the respective rheostats 1 and 2 are in the same angular position the bridge is balanced and no voltage appears across the diagonal 22—23 of the bridge circuit.

The transmitting and receiving rheostats 1 and 2 are of a circular type in which practically the full 360° circle of rotation is wound with resistance wire so that the beginning and end of the winding are brought close together. The contactors 6 and 7 of the respective rheostats 1 and 2 can rotate without limit in either direction and pass smoothly across the gap between the ends of the winding. Such rheostats are commercially available. Identical rheostats 1 and 2 may be used, or they may be of a different size and resistance. If they are different resistances the resistors 12 and 13 will differ in the same ratio. Each rheostat is used as a two-terminal device. Terminals 5 and 9 of the respective rheostats 1 and 2 are connected together and to ground which is the point 25 of the bridge. The contactor 6 of transmitter 1 is connected to point 22 through line 8 and the contactor 7 of receiver 2 is connected to point 23 through dummy line 21. Contactors 6 and 7 are also shown connected to the other terminals 10 and 11 of the respective rheostats 1 and 2. This connection provides for limiting the resistance in the respective arms of the bridge in the event that either contactor should during movement lose connection with the resistance winding, as might occur in crossing between 5 and 10 or 9 and 11 if the gap exceeds the width of the contact arm.

The contactor arms 6 and 7 of transmitter 1 and receiver 2 respectively may be rotated in either direction as far as desired. There is thus no limit to the range of the transmitter. The variation in resistance of the rheostats 1 and 2 is such that the resistance is a unidirectional function of angular position of the respective contactors 6 and 7 with a discontinuity occurring as the contactor crosses the gap from maximum resistance to minimum resistance whenever a cycle is repeated. Each time the contactor 6 crosses the gap between contacts 10 and 5 there is developed a discontinuity in resistance, and this discontinuity is employed in this invention to effect corresponding motion of the receiver 2 as will become evident.

The points 22 and 23 of the bridge are connected to an amplifier 16 whose output drives the motor 3. Except when balanced, the bridge circuit will produce an error voltage of one polarity or the other across leads 14 and 15 whenever there is an unbalance caused by disproportionate positioning of contactors 6 and 7. This error voltage is amplified by the amplifier 16 and fed to winding 17 of a reversible motor 3. The motor is a polarity-sensitive servomotor, i. e. it reverses its direction of rotation if the error voltage reverses in polarity. It is preferred to operate the bridge on A.-C. and in this event the motor 3 may be of the two-phase type having one winding 20 energized directly from the source and a quadrature winding 17 energized through condenser 19 from the amplifier output. Condenser 19 is ordinarily useful in providing a phase shift of about 90 degrees between the servomotor windings 17 and 20, but may be omitted if amplifier 16 is designed to provide the desired phase shift. The motor is so phased that it will crank receiver 2 in the direction to reduce the error voltage, i. e. toward balance. A mechanical connection 18 connects the motor 3 to the shaft of receiving rheostat 2 and preferably includes a speed-reduction gear (not shown).

As so far described the motor 3 will effect balance of the bridge by moving the contactor 7 of rheostat 2 into a position of substantially zero error voltage in which condition the bridge is substantially balanced and the contactor 7 repeats the angular position of contactor 6 of transmitter 1. In order to provide correct repetition of the repeater arm 7 as the transmitter arm 6 passes the discontinuity between contacts 10 and 5, there is provided a relay 4 whose coil 30 is connected across the bridge diagonal 22—23 by means of leads 32 and 33. The contactor elements of the relay 4 are of the double-pole double-throw type and are connected to function as a reversing switch in the circuit of winding 17 as shown. As the transmitter arm 6 rotates, the receiver arm 7 will follow, being driven by the motor 3 under the influence of the amplified error signal. The device automatically maintains a minimum error signal, and the receiver arm lags the transmitter arm by an infinitesimal amount. However if the transmitter arm 6 crosses its rheostat gap 10—5 in either direction a moment before (or after) the receiver arm 7 crosses its rheostat gap 11—9, then the voltage discontinuity at the discontinuous transition suddenly gives rise to an abnormally large component of error voltage. Furthermore this large error voltage is in the wrong sense to urge the receiver arm 7 across the gap between its contacts 11 and 9 in synchronism with motion of the arm 6. However, the large error voltage actuates the relay coil 30 which in this invention automatically reverses the connections and directional sense of motor 3 to compensate for the reversal of the error voltage. In this manner the large error signal occurring when arm 6 crosses the gap 10—5 causes the motor 3 to rotate the arm 7 over the gap in the proper direction to follow the motion of transmitting arm 6.

Relay 4 should be a fast-acting device so that it will reverse the motor connections quickly on receiving the large (reversed) error signal. A spring 31 returns the relay contacts to the normal position as soon as the error signal again becomes small. It has been found desirable to arrange for the relay to pick up whenever the error signal exceeds about one-half of the maximum possible error voltage, and to drop out whenever the error signal is less than about one-half of the maximum possible error voltage. The relay 4 ordinarily requires a certain relay differential between pick-up and drop-out, and a relay which picks up when the error signal is about two-thirds of the maximum possible error signal and which drops out when the error signal is about one-third of the maximum possible error signal has been found satisfactory. With this sensitivity and relay differential the motor 3 will drive the receiving arm 7 across the gap and the arm will follow faithfully the crossing of the gap by the transmitting contact arm 6. After the receiving arm 7 has crossed the gap, the error voltage immediately drops to a low value and the spring 31 returns the relay to its normal position. When the relay drops out the motor 3 will have carried the receiving arm 7 over to the synchronized side of the gap where balance can be restored and the motor can take up its proper synchronized position promptly.

In explaining the operation of this invention, it is of interest to examine what would happen in the absence of relay 4. Let us assume that the contactor 6 is rotating slowly clockwise and contactor 7 follows. This may continue until arm 6 reaches terminal 10 and arm 7 reaches terminal 11. As the contactor 6 passes the terminal 10 of the rheostat 1 and crosses the gap to contact 5, there is suddenly developed a high error voltage between points 22 and 23 in the direction to urge the motor to drive contactor 7 counter-clockwise from terminal 11 of rheostat 2 to its proper position near contact 9. The contactor 7 will reach the same angular position as contactor 6, but in doing so it will have subtracted a whole turn from the desired position. A similar result takes place if the transmitting contactor 6 crosses the gap in a counter-clockwise direction. It is thus seen that without the relay 4 the motion of receiver 2 is limited to slightly less than one revolution.

This invention, by including the relay 4, provides for complete synchronization of receiver motion to transmitter motion regardless of the number of complete revolutions made, the receiver always making the same number of whole revolutions plus fractional revolution as the transmitter.

Whereas the operation of the invention has been described employing an A.-C. source connected at 28, the invention may alternatively employ a D.-C. source connected at 28. In this event the winding 20 may be the field coil of a D.-C. motor and the winding 17 the armature of the motor. The amplifier 16 is then a D.-C. amplifier and condenser 19 is omitted.

The amplifier is not an essential part of the invention since it may be omitted if relatively heavy rheostats and resistors are used and if line 8 is short enough to be of low resistance. In some applications a polarized relay may serve suitably as an amplifier.

The relay 4 may be made quite sensitive, but if the motor 3 must drive a heavy load in addition to the rheostat 2, the relay 4 may comprise an electronic switch or a sensitive relay which electrically controls a power relay which in turn reverses connections to the motor winding 17. Alternatively the relay may control a reversing clutch (not shown) in the mechanical connection 18 whenever the error voltage exceeds the predetermined amount. Obviously, relay coil 30 may also be preceded by a separate amplifier or be fed by output from amplifier 16. The relay 4 thus serves as a means to reverse the sense of the servo-control whenever a sufficiently large error voltage occurs to effect operation of the relay, and its spring 31 serves as a means to restore the sense of the servo-control whenever the error voltage is relatively small.

If both rheostats 1 and 2 are linear, the repeater will follow angular changes in the rotation of the shaft transmitter 1. It is seen that the repeater will operate over a single line 8 and this is desirable for many applications. An example of such an application is in well surveying where rotation of a member in the well is to be repeated at the surface. The rotating element in the well may for example be the impeller of a flowmeter or other device in which an infinite range of rotation is to be repeated at the surface of the ground.

In some applications of the invention it may be desirable for the repeater to rotate as some predetermined function of transmitter rotation and this may be accomplished by winding the appropriate one of the rheostats 1 or 2 in a non-linear manner to effect the desired variation of response. The rheostats may alternatively vary abruptly in step-wise manner and may either or both be tap switches with a series of fixed resistors. Each step must be substantially smaller than the discontinuity which occurs at the repeat of the cycle since only the latter discontinuity may operate the relay 4.

In order to avoid ambiguity in the repeater indication the rheostats 1 and 2 must vary in only one sense for motion in a given sense, i. e. the resistance should not reverse its sense of change until the end of the cycle is reached or the direction of rotation reversed. For purposes of this invention, such rheostat may be said to have a unidirectional variation of resistance with angular position of its contact arm except for the discontinuity which occurs at the end of a cycle.

The invention may employ variable impedances instead of rheostats 1 and 2 in which event A.-C. excitation must be supplied to the terminals 28. For example, the rheostats 1 and 2 may be replaced by variable inductors, the latter being toroids having sliding contactors. Balance of the bridge in this case requires balance of the impedances but resistors 12 and 13 may still be used in two arms of the bridge.

Figure 3:
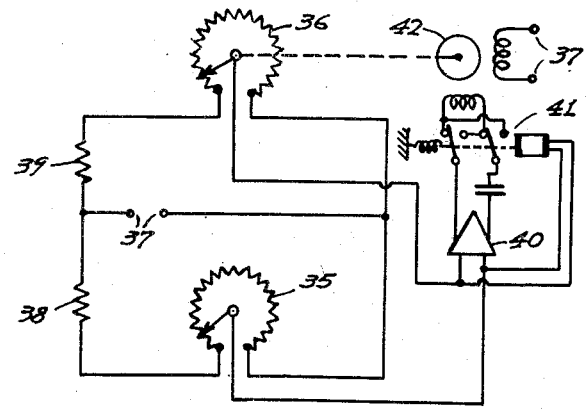
Figure 3 is a wiring diagram of an alternative embodiment of the invention in which potentiometers are employed.

Figure 3 shows a variation of Figure 2 in which the rheostats 35 and 36 are connected to a power source 37 through fixed resistors 38 and 39. The circuit is similar to Figure 2 except that the rheostats are of the potentiometer type having 3 terminals, one of which is the sliding contact. The sliding contacts are connected to an amplifier 40 which is connected through a condenser and the contacts of reversing relay 41 to one winding of a motor 42. The other phase of the motor is connected to the power source 37. The relay coil is connected in parallel with the amplifier input. The relay contacts are connected in such manner that as the transmitter potentiometer 35 is moved, the unbalance voltage between the two contactors is amplified and drives the motor 42 in the correct direction to reduce the unbalance voltage. For linear potentiometers this brings the contactor of potentiometer 36 into the same angular position as that of 35. The relay 41 normally does not operate from a small unbalanced voltage. However, if the contactor of potentiometer 35 crosses the gap between the ends of its winding, the sudden large error voltage causes the relay 41 to operate thus reversing the action of motor 42. The application of the large reversed error voltage to the motor causes it to urge the contactor of potentiometer 36 across the gap in the same direction as the contactor of potentiometer 35. In order to avoid open circuit conditions in the balancing circuit, the contactors of the respective potentiometers should be sufficiently wide to bridge the gap as it crosses from one end of the potentiometer winding to the other. Alternatively a connection (not shown) may be made between the contactor of the respective potentiometers 35 and 36 and the contact of the winding which is connected to the resistors 38 and 39 respectively, and when this is done the circuit of Figure 3 becomes substantially the same as that of Figure 2.

Figure 4:
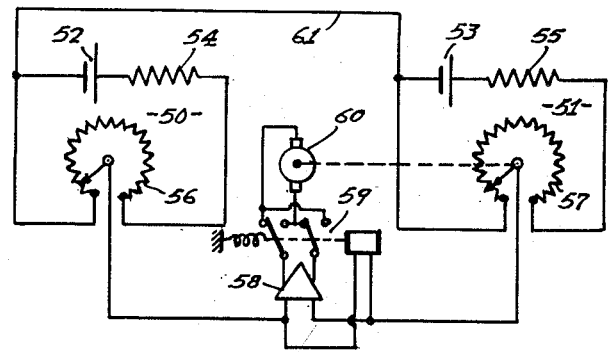
Figure 4 is a wiring diagram of a further embodiment of the invention employing potentiometers with separate voltage supplies.

Figure 4 shows two potentiometer circuits 50 and 51 each respectively having a battery 52 and 53, a fixed resistor 54 and 55, and a potentiometer 56 and 57, the latter serving as transmitter and receiver respectively. The contactors of the respective potentiometers are connected to an amplifier 58 whose output passes through reversing relay 59 to a motor 60. The balancing circuit is completed through connection 61 which connects like terminals of the batteries 52 and 53 as shown. The motor 60 drives the contact arm of receiving potentiometer 57. The normal deenergized position of relay 59 is such that the contact arm of potentiometer 57 is driven in the proper direction to reduce the error voltage appearing between the two potentiometer contactors. If linear potentiometers are employed the motor 60 drives the potentiometer 57 into the same angular position as that of 56. It is apparent that the receiving potentiometer 57 follows motion of the transmitting potentiometer until the latter crosses the gap between the ends of the winding. When the contactor of potentiometer 56 crosses the gap, a large error voltage appears. Without action of the relay 59 this error voltage would cause contactor of potentiometer 57 to return to the other end of the winding 57 in reversed direction. However, in this invention the large error voltage causes operation of the relay 59 thus reversing the motor and the contactor of potentiometer 57 is urged across the gap to faithfully follow the motion of the transmitting potentiometer 56. In order to avoid open circuit conditions in the balancing circuit, the contactors of the respective potentiometers should be sufficiently wide to bridge the gap as it crosses from one end of the potentiometer winding to the other.

Figure 5 shows an embodiment of the invention employing a bridge-like circuit having batteries 82 and 83, connected respectively to fixed resistors 84 and 85, and rheostats 86 and 87. The rheostat 86 comprises the transmitting device, and the rheostat 87 is the receiving device which has its shaft driven by the motor 88. The transmitting rheostat 86 may be located remotely in which case the resistor 84 represents the line resistance. The points 90 and 92 are connected to a neutral-type polar relay whose armature and contacts are centered when deenergized. The relay 89 is of the reversing type and functions as an unbalance detector and amplifier. This is accomplished by supplying power at terminals 91. A second relay 94 of the double-pole, double-throw type (similar to relays 4, 41, and 59) is connected in parallel with the coil of polar relay 89. The contacts of relay 94 are normally held by means of a spring in such a position that when a small error voltage appears between points 90 and 92, the polar relay 89 will supply power from the source 91 to the terminals 95 leading to the motor 88 in such direction as to effect rotation of the potentiometer 87 to reduce the error voltage to a minimum. The contactor of rheostat 87 thus follows motion of the contact of rheostat 86. When the latter crosses the gap at the end of its winding, the large error voltage operates relay 94 so that the motor 88 will urge the contactor of rheostat 87 across its gap in the same direction as the movement executed by the contactor of transmitter 86.

In Figure 5 the relay 89 functions as an amplifier and it controls the application and direction of power from the source 91 to the terminals 93 and hence to the motor 88. It is apparent that a relay similar to relay 89 of Figure 5 may be employed instead of the amplifier shown in Figures 2, 3 and 4.

The relay 94 of Figure 5 functions as a reversing relay in a manner similar to the reversing relays 4, 41, and 59 described in the other figures. The relays 4, 41, 59 and 94 are spring biased into the normal position and are actuated only when a large voltage is applied to their coils as explained in describing the operation of Figure 1. The relays 4, 41, 59 and 94 of the respective embodiments shown preferably operate to reverse the sense of the servo control for error voltage which exceeds one-half the maximum possible error voltage and preferably restore the sense of the servo control for error voltage which is less than one-half the maximum possible error voltage.

This invention thus provides a means of repeating the motion of a transmitter shaft without limit in either direction and the receiver shaft will make as many rotations and fractional rotations as the transmitter.

I claim:

1. In a self-balancing electromechanical network having a variable circuit element whose electrical characteristic is a unidirectional function of the position of a control member throughout a range of movement and has a discontinuous transition upon repeating a cycle of movement and having servo means responsive to network unbalance and adapted to move the control member in such sense as to restore the network to a balanced condition, the improvement which comprises means connected to the network and to the servo means adapted to reverse the sense of the servo response whenever the network unbalance exceeds a predetermined first amount, and means connected to the network and to the servo means adapted to restore the sense of the servo response whenever the network unbalance is less than a second predetermined amount.

2. In a self-balancing electromechanical network having a circuit element whose electrical characteristic is a unidirectional function of the angular position of a control member throughout substantially a complete revolution and has a discontinuous transition upon repeating a rotational cycle and having servo means responsive to network unbalance and adapted to rotate the control member in such sense as to restore the network to a balanced condition, the improvement which comprises means connected to the network and to the servo means adapted to reverse the sense of the servo response whenever the network unbalance exceeds a predetermined first amount, and means connected to the network and to the servo means adapted to restore the sense of the servo response whenever the network unbalance is less than a second predetermined amount.

3. In a self-balancing bridge circuit having a power source connected to one diagonal and servo means connected to the other diagonal and adapted to operate on one arm of the bridge to reduce the bridge unbalance to a minimum, the improvement which comprises transmitting and receiving impedances of a rotary type with limitless motion and whose impedances vary between minimum and maximum values without regression except at one angular interval where the impedance changes abruptly from one extreme to the other, means for reversing the sense of the servo response whenever the bridge unbalance exceeds a first predetermined amount, and means for restoring the sense of the servo response whenever the bridge unbalance is less than a second predetermined amount.

4. In a self-balancing bridge circuit having a power source connected to one diagonal and servo means connected to the other diagonal and adapted to operate on one arm of the bridge to reduce the bridge unbalance to a minimum, the improvement which comprises transmitting and receiving rheostats of a rotary type with limitless motion and whose resistances vary between minimum and maximum values without regression except at one angular interval where the resistance changes abruptly from one extreme to the other, means for reversing the sense of the servo response whenever the bridge unbalance exceeds a first predetermined amount, and means for restoring the sense of the servo response whenever the bridge unbalance is less than a second predetermined amount.

5. In a self-balancing bridge circuit having a power source connected to one diagonal and servo means connected to the other diagonal and adapted to operate on one arm of the bridge to reduce the bridge unbalance to a minimum, the improvement which comprises transmitter and receiver impedances of a rotary type with limitless motion and whose impedances vary between minimum and maximum values without regression except at one angular interval where the impedance changes abruptly from one extreme to the other, means connected to the bridge and to the servo means adapted to reverse the sense of the servo response for a bridge unbalance which is greater than one-half of the maximum possible amount, and means connected to the bridge and to the servo means adapted to restore the sense of the servo response for a bridge unbalance which is less than one-half of the maximum possible amount.

6. A self-balancing bridge network comprising a bridge circuit, two variable impedances each of whose impedance is a unidirectional function of the position of a control member throughout a range of movement and has a discontinuous transition upon repeating a cycle of movement, means respectively connecting each of said impedances in an arm of said bridge circuit, impedances connected in the other arms of said bridge circuit, means connecting a power source to one diagonal of said bridge, means connecting a servomotor to the other diagonal of said bridge, said servomotor being responsive to bridge unbalance, means mechanically connecting said servomotor to the control member of one of said impedances, said servomotor response and said mechanical connection being of such sense that in response to voltage across the last-named diagonal of said bridge the servomotor effects a reduction of said voltage, and means for reversing the sense of said servomotor when the bridge unbalance exceeds a predetermined amount, and means for restoring the sense of said servomotor when the bridge unbalance is less than a predetermined amount.

7. A self-balancing bridge network comprising a bridge circuit, two rotary variable impedances each of whose impedance is a unidirectional function of the angular position of a control member throughout substantially a complete revolution and has a discontinuous transition upon repeating a rotational cycle, means respectively connecting each of said impedances in adjacent arms of said bridge circuit, impedances connected in the other two arms of said bridge circuit, means connecting a power source to one diagonal of said bridge, means connecting a servomotor to the other diagonal of said bridge, said servomotor being responsive to bridge unbalance, means mechanically connecting said servomotor to the control member of one of said impedances, said servomotor response and said mechanical connection being of such rotational sense that in response to voltage across the last-named diagonal of said bridge the servomotor effects a reduction of said voltage, and means for reversing the rotational sense of said servomotor when the bridge unbalance exceeds a predetermined amount, and means for restoring the rotational sense of said servomotor when the bridge unbalance is less than a predetermined amount.

8. A self-balancing bridge network comprising a Wheatstone bridge circuit, two rotary rheostats each of whose resistance is a unidirectional function of the angular position of its contact arm throughout substantially a complete revolution and has a discontinuous transition upon repeating a rotational cycle, means respectively connecting each of said rheostats in adjacent arms of said bridge circuit, resistances connected in the other two arms of said bridge circuit, means connecting a power source to one diagonal of said bridge, means connecting a servomotor to the other diagonal of said bridge, said servomotor being responsive to bridge unbalance, means mechanically connecting said servomotor to the arm of one of said rheostats, said servomotor response and said mechanical connection being of such rotational sense that in response to voltage across the last-named diagonal of said bridge the servomotor effects a reduction of said voltage, and means for reversing the rotational sense of said servomotor when the bridge unbalance exceeds a predetermined amount, and means for restoring the rotational sense of said servomotor when the bridge unbalance is less than a predetermined amount.

No references cited.